United States Patent
Larky et al.

(10) Patent No.: US 6,389,495 B1
(45) Date of Patent: *May 14, 2002

(54) DEDICATED CIRCUIT AND METHOD FOR ENUMERATING AND OPERATING A PERIPHERAL DEVICE ON A UNIVERSAL SERIAL BUS

(75) Inventors: Steven P. Larky, Del Mar; Lane Hauck, San Diego, both of CA (US)

(73) Assignee: Cypress Semiconductor Corp., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/232,578

(22) Filed: Jan. 16, 1999

(51) Int. Cl.[7] .......................... G06F 13/14; G06F 12/00
(52) U.S. Cl. .............................. 710/129; 710/8; 710/9; 710/53; 710/102
(58) Field of Search .................. 710/129, 102, 710/8, 53, 9

(56) References Cited

U.S. PATENT DOCUMENTS

| | | | |
|---|---|---|---|
| 4,866,606 A | 9/1989 | Kopetz | 364/200 |
| 4,890,222 A | 12/1989 | Kirk | 364/200 |
| 5,388,249 A | 2/1995 | Hotta et al. | 395/550 |
| 5,392,421 A | 2/1995 | Lennartsson | 395/550 |
| 5,402,394 A | 3/1995 | Turski | 368/10 |
| 5,461,723 A | 10/1995 | Shah et al. | 395/293 |
| 5,621,902 A | 4/1997 | Cases et al. | 395/309 |
| 5,628,001 A | 5/1997 | Cepuran | 395/556 |
| 5,630,147 A | 5/1997 | Datta et al. | 395/750 |
| 5,642,489 A | 6/1997 | Bland et al. | 395/308 |
| 5,675,813 A | 10/1997 | Holmdahl | 395/750 |
| 5,748,911 A | 5/1998 | Maguire et al. | 395/281 |
| 5,748,923 A | 5/1998 | Eitrich | 395/309 |
| 5,754,799 A | 5/1998 | Hiles | 395/290 |
| 5,767,844 A | 6/1998 | Stoye | 345/212 |
| 5,774,744 A | 6/1998 | Story et al. | 395/847 |
| 5,778,218 A | 7/1998 | Gulick | 395/558 |
| 5,781,028 A | 7/1998 | Decuir | 326/30 |
| 5,974,486 A | * 10/1999 | Siddappa | 710/53 |
| 6,012,103 A | * 1/2000 | Sartore et al. | 710/8 |
| 6,145,045 A | * 11/2000 | Falik et al. | 710/129 |
| 6,148,354 A | * 11/2000 | Ban et al. | 710/102 |
| 6,173,355 B1 | * 1/2001 | Falik et al. | 710/129 |

OTHER PUBLICATIONS

Universal Serial Bus Specification, Revision 1.0, Jan. 15, 1996, pp. 1–267.
Intel USB Mobile System Design Guidelines, Revision 1.0, Nov. 6, 1996, pp. 1–19.
Universal Serial Bus and the Multimedia PC, by Kosar A. Jaff, 1996, pp. 1–9.
Intel USB Voltage Drop and Droop Measurement, Nov. 18, 1996, pp. 1–19.
Universal Serial Bus Specification, Revision 1.1, Sep. 23, 1998, pp. 1–311.

\* cited by examiner

Primary Examiner—Thomas Lee
Assistant Examiner—Tammara Peyton
(74) Attorney, Agent, or Firm—Christopher P. Maiorana, P.C.

(57) ABSTRACT

A circuit for a use in a control system of a peripheral device that is dedicated to tasks related to communication with a host computer via a universal serial bus (USB). The invention affords a USB dedicated circuit that is configured to allow a host computer to recognize and enumerate a device as a USB configured device without the use of the device's micro-controller. In another aspect of the invention a USB dedicated circuit that is configured to perform other USB related tasks in conjunction with the device's micro-controller in a more efficient manner than a device operating solely with a micro-controller.

27 Claims, 9 Drawing Sheets

1. USB dedicated circuit copies Setup data to RAM, eliminating
    the FIFO-to-RAM copy step. CPU decodes the
    "Get Descriptor" request 2. CPU sets pointer to descriptor table in RAM, USB dedicated circuit does entire multi-packet transfer.

Fig. 7b

DEDICATED CIRCUIT AND METHOD FOR ENUMERATING AND OPERATING A PERIPHERAL DEVICE ON A UNIVERSAL SERIAL BUS

BACKGROUND OF THE INVENTION

The invention relates generally to devices and methods for communicating between a host computer and a peripheral device such as a keyboard or mouse and, more particularly, to recognizing and enumerating a peripheral device as a compliant Universal Serial Bus (USB) device and for performing other USB functions by using a micro-controller and a USB dedicated circuit interchangeably.

A common personal computer system has a main central processing unit (CPU) enclosed within a housing and one or more peripheral devices, such as a keyboard, a mouse, a monitor, a modem or a printer physically connected to the housing and electrically connected to the CPU by a different connector, i.e., ports, and different electrical buses, respectively. Each device typically has a different type of "standard" interface connector and bus. These different connectors and electrical buses include serial buses, parallel buses and RS-232 ports. Typically, each of these different buses has different signaling requirements and requires different connectors to the housing. For example, a parallel bus has a certain physical connector and communicates bits of data in parallel, i.e., a predetermined number of bits at the same time. In contrast, a serial bus may have a different physical connector and may transmit bits of data in a serial manner, i.e., one bit at a time.

In order to connect different peripheral devices to a personal computer, it has often been necessary to use several different types of standard local electrical buses and associated ports, such as serial ports for a modem, a mouse and a keyboard and a parallel port for the printer. This led to unnecessary complexity since each peripheral device may use a different connection and bus. To establish some standard and avoid such complexity, the USB was created to make the task of connecting peripheral devices to the computer easier. The USB replaces the multiple cable, ports and physical connectors with a single standardized connection system. The USB also permits peripheral devices to be connected to and disconnected from the bus while the computer system is powered up. This eliminates the need to shut down and "re-boot" the computer every time that a peripheral device is connected or disconnected, as is the case with most other non-USB buses. The USB further permits a peripheral device connected to the USB to be detected and the port to be appropriately configured automatically using a configuration process for the device known as enumeration.

When a peripheral device is first connected to the USB and a host computer through a standard USB communications port, the presence of the connected peripheral device is detected by the host computer and enumeration begins. In the enumeration process, the host computer assigns a unique USB address to the connected peripheral device, queries the connected peripheral device about its requirements and capabilities, writes data about the connected peripheral device into the host computer's operating system, and loads the appropriate software device driver from a storage location into the host computer's operating system. During the query, a data table stored in the peripheral device, which contains the particular peripheral device's configuration information, is read from the peripheral device into the host computer's memory and is used by the host computer's software device driver to control the peripheral device. Upon completion of the enumeration process, the connected peripheral device is recognized by the host computer's operating system, allowing its functions to be used by the host computer in executing application software. The association of the device with the software device driver cannot be subsequently changed.

During enumeration, a micro-controller used to control the transmission of data from the peripheral device must respond to the host. Thus, the micro-controller must be active prior to enumeration in order to respond when the host requests or sends data. There exist, however, peripheral devices having programmable control modules that operate entirely by software and that allow a host computer to modify the device's characteristics by downloading software code into the device's control memory. Before enumeration in these types of devices, the on-chip random access memory (RAM) powers on in an unknown state, leaving the micro-controller unable to respond to any requests by the host. This leaves the microprocessor physically connected, but not functionally connected. There are, however, a certain number of commands that must be supported during enumeration and that are needed before the micro-controller is loaded with code in the micro-controller's on-chip RAM. Therefore, the micro-controller must have access to certain software code that pertains to these commands and must be sufficiently active in order to respond to the host computer to enumerate the device.

Although the USB provides a number of advantages over standard peripheral device connection techniques, the USB does not provide a system and method for easily enumerating a device before the device's micro-controller has access to control code in its associated RAM. Lacking this, it is unable to automatically enumerate the peripheral device. Therefore, all software driven devices must be loaded with the proper code prior to connecting the device to the USB. Thus, it is desirable to provide a device and method for enumerating a software driven peripheral device when it is first connected to a USB and before code is loaded into the device's RAM, as well as to facilitate automatic enumeration of peripheral devices. It is to these ends that the present invention is directed.

SUMMARY OF THE INVENTION

The invention provides a circuit for use in a control system of a peripheral device that is dedicated to a number of USB related functions for efficient execution of data transfer operations between a host computer and a device via a USB. The invention affords a USB dedicated circuit that is configured to respond to a host computer when a device is first connected to a USB so that the host computer can recognize and enumerate the device without engaging the device's micro-controller. In another aspect, the invention provides a USB dedicated circuit that is configured to work in conjunction with the device's micro-controller to perform other USB related tasks in an efficient manner to free up data traffic in the device's micro-controller and allows the device to utilize a lower performance micro-controller.

DESCRIPTION OF PREFERRED EMBODIMENTS

The present invention is particularly adapted to control circuits used in peripheral devices configured to communicate with A Universal Serial Bus (USB) and will be described in that context. It will be appreciated by those skilled in the art, however, that this is illustrative of only one utility of the invention and that the invention has greater applicability.

Initially, while the foregoing will give a detailed description of the structure and configuration of different preferred embodiments of USB dedicated circuits according to the invention, it will be noted that the configurations and methods of producing such circuits according to the different embodiments have certain similarities, especially in terms of the location of different components and common processing steps, as will be described hereinafter. In some instances, the differences in the different embodiments are primarily due to different components. In other instances, differences are due to different processing steps. In any case, variations in components or processing steps are contemplated by the invention, as will be understood by those skilled in the art of computer systems employing USB technology. The following includes a description of a common computer system connected to such peripheral devices via a current version of a USB, such as that described in the Universal Serial Bus Specification, Copyright 1998, Compaq Computer Corporation, Intel Corporation, Microsoft Corporation, NEC Corporation, Revision 1.1, Sep. 23, 1998 (USB Specification). For purposes of understanding the invention, a device that conforms to such a standard is considered a "USB compliant device."

Figure 1:
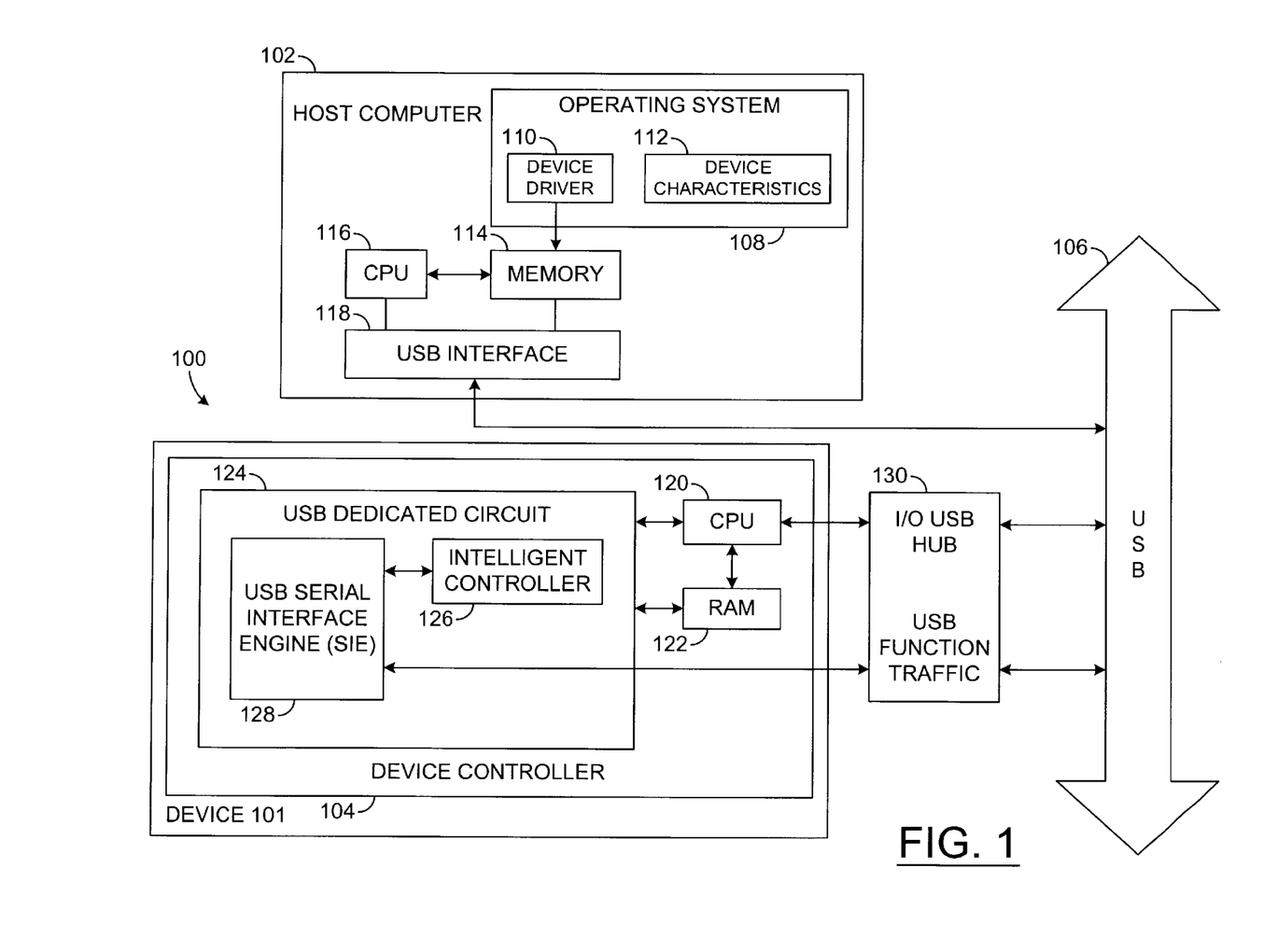
FIG. 1 is a block diagram of a computer system having a peripheral device with programmable controller attached to a host computer via a USB with which the invention may be used.

Referring to FIG. 1, an example of a computer system 100 utilizing an embodiment of the invention is shown. Computer system 100 includes a host computer 102 connected to device controller 104 of a peripheral device 101, via A Universal Serial Bus (USB) 106. Host computer 102 could be any one of a number of computer systems having a central processing unit for performing computer functions, such as a personal computer performing word processing and other functions. The host computer can be connected to one device 101 and/or a number of different peripheral devices such as a keyboard, mouse, joystick, telephone/facsimile/modem adapter, answering machine, scanner and other similar devices via USB 106.

Host computer 102 comprises an operating system 108 that includes one or more device drivers 110 for controlling different peripheral devices. Each driver defines device characteristics 112 for a particular device. These are transferred to a memory 114 for use by host computer 102 when communicating with the peripheral device 101. The USB Standard provides a standard electrical and physical interface for the peripheral devices to USB 106. Host computer 102 further includes a central processing unit (CPU) 116 configured to execute software application code and to perform the processing functions of the host computer 102. Both the host CPU 116 and the memory 114 may be connected to USB interface 118, as shown, which interfaces USB 106 so that information can be transferred between either the host CPU 116 or the memory 114 and device 101. Significantly, memory 114 further includes device configuration data which may be downloaded to device 101 for configuring the device. Generic configuration data for a number of different types and designs of devices may be stored in a library in memory 114 so that host computer 102 can be compatible with a number of different devices.

Still referring to FIG. 1, peripheral device controller 104 may include a device CPU 120 connected to a memory 122 and a USB dedicated circuit 124, comprising an intelligent controller 126, which could be a hardwired circuit, a state machine or another intelligent device that is separate from the CPU 120. The memory 122 may be a random access memory (RAM) or any other type of memory in which data can be written and altered. USB dedicated circuit 124 further includes a USB Serial Interface Engine (SIE)128 which is connected to USB Hub 130. Similarly, the CPU 120 is connected to the USB Hub 130.

The intelligent controller 126 in USB dedicated circuit 124 allows the device controller 104 to respond to the host computer 102 independently from device CPU 120 during enumeration. In known peripheral devices, the device CPU must always be active in order to respond to the host computer when the host computer communicates with the device. However, as will be described, the intelligent controller 126 of the USB dedicated circuit 124 of the invention allows the device controller 104 to perform certain USB related functions without the aid of the device CPU 120. In particular, the intelligent controller 126 may include software to be run using a dedicated micro-controller, a state machine that routinely responds to predetermined commands, a solid state circuit, or other circuit configured to respond to particular predetermined conditions in order to perform certain USB functions. It is well known that such an intelligent controller can be configured to perform the necessary functions and respond routinely to predetermined responses to enable the invention.

For example, a state machine can be configured to routinely respond to predetermined commands to perform data transfers and device control. A state machine can be designed to respond to signals from the host computer to identify and enumerate the device. A state machine, for example, can perform this function by sending information coded into the state machine that pertains to the device's identity, such as a manufacturer's signature, to the host computer in response to the host computer sending a SETUP command. Furthermore, a state machine can also be configured to store configuration data in RAM by receiving a command from the host computer followed by the configuration data. To this end, a routine can be programmed into the state machine to transfer configuration data received from the host computer via the USB and the USB interface into the device memory. Also, a routine can be programmed into the state machine to send a signal to the device CPU for relinquishing control of the peripheral device to the device CPU. Still further, a routine can be programmed into the state machine to receive a control signal from the device CPU controlling the device memory to store data received by the host computer and to retrieve data to be sent to the host. Other routines can be coded into the state machine to enable it to perform USB related tasks under the control of the device CPU. These and other USB functions are contemplated by the invention, some of which are discussed in further detail below. An understanding of the types of signals sent by the host computer to the device is helpful in order to understand the function of the USB dedicated circuit 124, and these will be described in more detail below.

When a software driven peripheral device is first attached to a USB and connected to power, it is not available for control by the host computer until the USB sends a reset signal. After receiving the reset signal, the device is addressable by the system at a default address. After the device is reset, the host computer performs an enumeration process in which it configures the device, assigns a unique address to the device and loads the appropriate drivers into memory.

More particularly, upon the device being connected to the USB Hub 130 of the USB 106 for communication with the host computer, the USB Interface 118 sends a signal to the host computer to indicate the presence of the newly connected device. In response, the CPU in the device's controller circuit retrieves data from its associated memory that contains the device's manufacturer signature code and sends it to the host computer. The host computer responds with a reset signal to the device to enable the bus port to which the device is connected. Next, the host computer sets a unique address for the device, and resets all of the device's registers to the new address.

In conventional peripheral devices, the host computer then reads the manufacturer's signature information from the device to determine whether the device is pre-programmed with a manufacturer's signature code to indicate the type of device so that the host can determine the device characteristics and assign a configuration value to the device. For example, a Hewlett-Packard printer would have a signature identifying it as such stored in its control memory. In response to the manufacturer's signature code, the host computer then loads an appropriate device driver into memory to drive the device. The device is now operating under its configuration code that is pre-programmed into its memory. At this point, the device is ready for use by the host computer. When the device is disconnected from the port, the USB Interface again sends a notification signal to the host indicating the absence of the device. The port is then disabled and the host computer updates its local topological information. Also, in current devices, the configuration step in the enumeration process includes the host computer reading the device and interface descriptors to identify the functions provided by the device and the protocols used to communicate with the functions on the device.

In contrast, the invention affords a device having a controller that includes a microprocessor with programmable memory 122 connected to intelligent controller 126 that, among other features, contains the manufacturer's signature information. Unlike conventional peripheral devices, the code containing the device's configuration information is not pre-programmed into the device's memory. It is downloaded to the device by the host computer according to the manufacturer's signature configured into the intelligent controller 126. Thus, in accordance with the invention, the device receives its configuration information from the host computer in response to the device uploading the manufacturer's signature information to the host, rather than the device providing configuration information to the host. Therefore, the host computer stores both the device drivers and configuration information for various different types of peripheral devices.

Although in the invention, the CPU of the device is unable to function without code provided by the host computer, the advantage is that the host may use a generic microprocessor and function with any type of software driven device that has an intelligent controller 126. Moreover, the functions provided by the intelligent controller free up the microprocessor to do other tasks. When the device is initially connected to the system, the memory located in the device controller has no control code, leaving the device's CPU 120 without software code with which to function and control the peripheral device. Hence, a secondary control circuit, the USB dedicated circuit 124, is provided to interact with the host computer in order to enumerate and configure the device. In this capacity, the USB dedicated circuit 124 responds to the host computer 102 during enumeration by sending the device's characteristic information, e.g., identifying itself as a keyboard, a mouse on some other type of peripheral device, by sending the manufacturer's signature of the device. The USB dedicated circuit 124 further controls memory 122 to store configuration data sent by the host computer during enumeration. This configuration data, or code, is necessary so that the device can function under the control of the device CPU 120. Once the memory is loaded with the code, the device CPU 120 can control the device 101 for normal communications with the host computer, and can utilize the intelligent circuit 126 to perform predetermined USB related functions.

In current peripheral devices, the configuration data is stored in the device before it is connected to the USB. This requires the device's CPU to respond to the host computer during enumeration. Thus, the device CPU must be active and have access to control code prior to being connected to the USB. Furthermore, the host computer is required to store different device drivers that pertain to devices that are similar in function, but that may have different configurations. This limits the flexibility of the devices and the host computer. For example, in current applications, since different printers typically have different configuration protocols, a host computer would require separate and different device drivers to be able to accommodate the various printers. This requires more memory in the host computer for compatibility.

In contrast, utilizing the invention, with a software driven printer having control circuitry with memory that can receive configuration information from the host computer, the host computer need only store generic configuration information suitable for a number of different printers and associated device drivers in its memory. When the printer is connected to the USB, it is met with a handshake protocol from the host computer, where the printer responds with its characteristic information, identifying itself to the host computer as a printer. The host computer can then download the configuration information of its own choice to the printer once it knows that it is in fact communicating with a printer, and load a suitable printer device driver into the host computer's memory. The printer is then ready for operation with the host computer and the device CPU is configured with the proper configuration information stored in the device memory for the CPU to control the peripheral device, including communication with the host computer.

Figure 2:
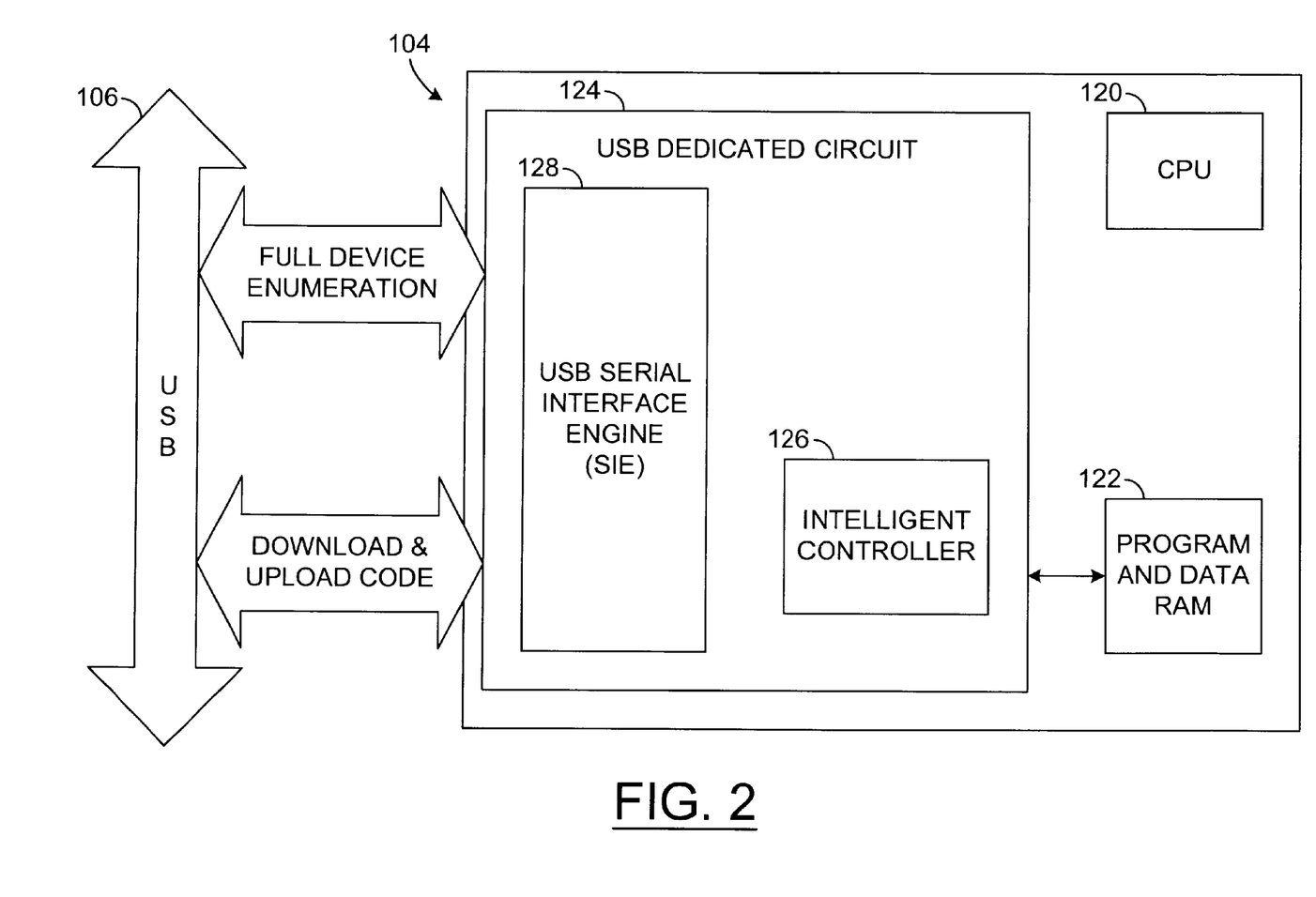
FIG. 2 is a block diagram of a control system for a peripheral device in start-up mode and prior to enumeration in accordance with the invention.

Referring to FIG. 2, a software driven peripheral device controller 104 is shown prior to the associated peripheral device (not shown) being enumerated. The USB dedicated circuit 124 having USB Serial Interface Engine (SIE) 128 and intelligent controller 126 is configured to receive control transfers from the host and perform a full device enumeration without the use of the device CPU 120. The CPU may be physically part of the controller 104, but, lacking operable code, it is not functionally connected to manage control of the peripheral device including communications with the host computer. Utilizing a state machine or other intelligent controllers, the USB dedicated circuit 124 in accordance with the invention is configured to download and receive software code from the host computer and load it into the device RAM 122. Once this is completed, the device is recognized by the USB, is enumerated by the host computer and is configured with configuration information, i.e., software code, transferred from the host and loaded into RAM 122 under the control of the intelligent controller 126. The intelligent controller 126 then sends a signal to the CPU 120 to assume control of the device and to begin operation. The device is now ready for operation and is ready to communicate normally with the host computer and the CPU is configured to control the peripheral device, including managing communication with the host computer. Once configured, the CPU 120 can either perform and manage all control tasks or can delegate certain tasks to the intelligent circuit 126 to reduce signal traffic in the CPU 120, as will now be described.

Figure 3:
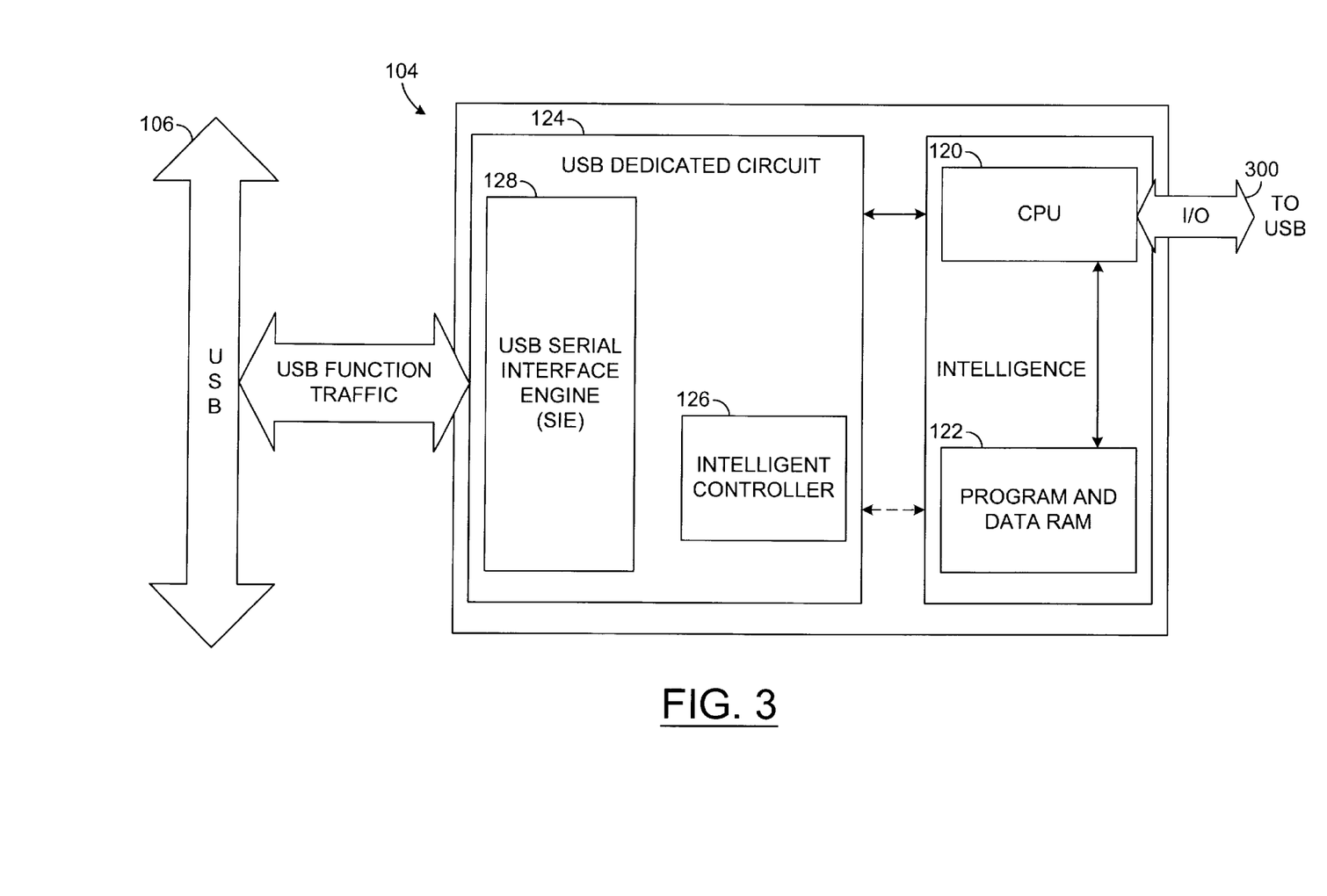
FIG. 3 is a block diagram of a control system for a peripheral device in start-up mode and after enumeration in accordance with the invention.

Referring now to FIG. 3, the device controller 104, containing the newly configured USB dedicated circuit 124 that comprises the same SIE 128 and intelligent controller 126 as that described above, is shown following the downloading of configuration information and code for the CPU from the host computer. Controller 126 can now be utilized by the device CPU 120, which is now configured to manage and control the input and output traffic 300 and to work in conjunction with USB dedicated circuit 124 by loading configuration information into Program and Data RAM 122. The USB dedicated circuit 124 can then operate with intelligent controller 126 to communicate with the host computer via the USB.

After enumeration, the CPU 120 can utilize the intelligent controller 126 to communicate with the USB. In this respect, the CPU 120 can utilize the intelligent controller 126 to perform basic USB type functions and data transfers. For example, the CPU can utilize the commands embodied in the endpoints of Table 1, discussed below, to perform interface and other communications with the USB. Furthermore, the host computer can reconfigure the device controller via a separate control transfer by reloading new configuration information into the RAM 122. The logic in the intelligent circuit 126 may also be configured to perform low level tasks involved in a control transfer between the host computer 102 and device 101 (see FIG. 1), such as data toggle sequencing and combining the data to be transferred from the device into properly sized data packets that conform to the USB standard. This simplifies a control transfer for the device CPU 120, helps to ensure correct USB standard operation, minimizes the amount of code used by the CPU 120, speeds up the control transfer, and reduces the traffic in the CPU 120, allowing for other tasks.

Protocols of the host computer used for enumeration and configuration may be handled by a protocol layer transaction called a Control Transfer. Two such transfers to the device are illustrated diagrammatically in FIGS. 4 and 5. Data and command transfers are performed over a USB by control transfers in data packets. These may include a token packet, a data packet and a handshake packet.

Figure 4:
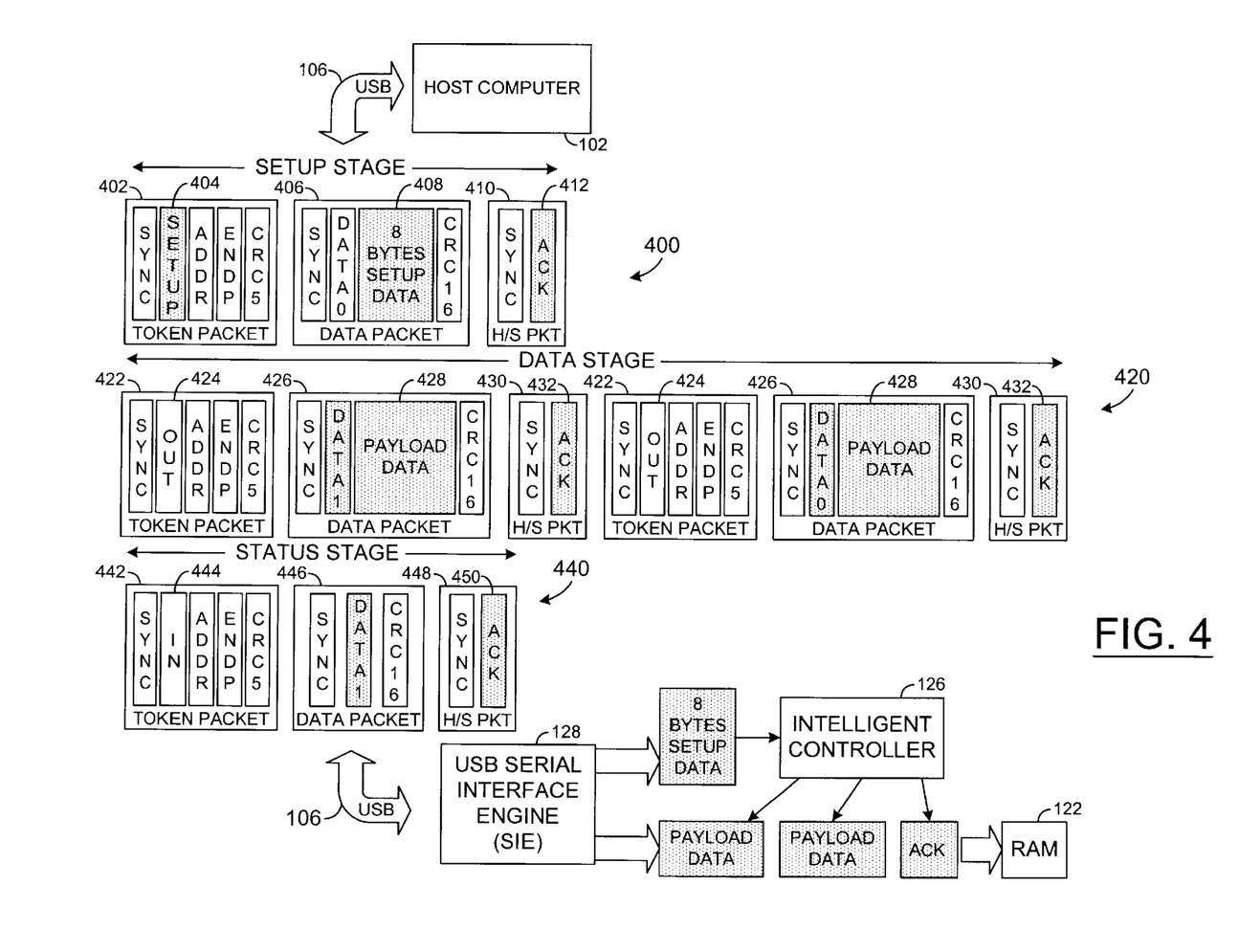
FIG. 4 is a diagrammatic view illustrating a USB control transfer during device enumeration utilizing a USB dedicated circuit in accordance with the present invention.

FIG. 4 illustrates a control transfer for use during enumeration of a device. The SETUP stage 400 includes a token packet 402 with SET-UP field 404, a data packet 406 including 8 bytes of set-up data 408, and a handshake packet (H/S Pkt) 410 that includes an acknowledgment (ACK) field 412. A control transfer can have an optional data stage 420 as required. The DATA Stage 420 includes token packets 422 having fields 424 indicating the direction of the signal, IN being a transfer from the device to the host computer and OUT being a transfer from the host computer to the device, data packets 426 having payload data fields 428 for defining status, and a handshake packet 430 having an acknowledgment (ACK) field 432. The STATUS Stage 440 includes a token packet 442 having a directional field 444, a data packet 446, and a handshake packet (H/S Pkt) 448 having an acknowledgment (ACK) field 450. Such a control transfer is used by the host computer when a peripheral device is first connected to the system in order to enumerate the device and, in accordance with the invention, load the RAM 122 of the device controller with software code that contains the device's configuration information. In a preferred embodiment, eight bytes of set-up data are sent to the device during the stet-up stage, allowing the intelligent controller 126 to enumerate the device with the host computer (not shown in FIG. 4).

Still referring again to FIG. 4, in operation, a SETUP stage 400 is transferred by the host to the device. The SETUP stage includes 8 bytes of set-up data 408 within data packet 406. These 8 bytes are received by the USB SIE 128 and transferred to the intelligent controller 126 for interpretation. In the control transfer of FIG. 4, the set-up data 408 is received by intelligent controller 126. As discussed above, the intelligent controller 126 can be a state machine containing a set of end points that would be interpreted by the host computer. Table 1 below illustrates an example of a generic set of USB endpoints that may be contained in a state machine or a similar device for responding to enumeration protocol from a host.

TABLE 1

|  |  | Alternate Setting | | |
|  |  | 0 | 1 | 2 |
| Endpoint | Type | Max. Packet Size (bytes) | | |
| --- | --- | --- | --- | --- |
| 0 | CTL | 64 | 64 | 64 |
| 1 IN | INT | 0 | 16 | 64 |
| 2 IN | BULK | 0 | 64 | 64 |
| 2 OUT | BULK | 0 | 64 | 64 |
| 4 IN | BULK | 0 | 64 | 64 |
| 4 OUT | BULK | 0 | 64 | 64 |
| 6 IN | BULK | 0 | 64 | 64 |
| 6 OUT | BULK | 0 | 64 | 64 |
| 8 IN | ISO | 0 | 16 | 256 |
| 8 OUT | ISO | 0 | 16 | 256 |
| 9 IN | ISO | 0 | 16 | 16 |
| 9 OUT | ISO | 0 | 16 | 16 |
| 10 IN | ISO | 0 | 16 | 16 |
| 10 OUT | ISO | 0 | 16 | 16 |

Table 1 illustrates the type of endpoints used in an enumeration transaction such as an isochronous data transfer (ISO), a bulk data transfer (BULK), a control transfer (CTL), and an interrupt transfer (INT). These end points are utilized by the intelligent controller to enumerate the device as a USB device and to perform other related USB related functions. The intelligent controller 126 then directs the payload data 428 received by the device SIE 128 in data stage 420 to load code containing configuration data into the device RAM 122. This is consistent with the directional fields found in the data stage and the status stage as shown in FIG. 4, where the IN field indicates a transfer from the device to the host computer and where the OUT field indicates a transfer from the host to the device.

Still referring to FIG. 4, a USB control transfer consists of a data stage 420 having data packets that are identified by special codes called Packet ID's (PIDS). The bulk transfer shown in data stage 420 uses four types of PIDS: OUT, DATA0, DATA1, and ACK. The first packet shown is an OUT token, which announces that the host is about to send data to the peripheral device. As discussed above, the USB direction protocol is host-centric, where OUT means sending from the host computer to the device and where IN means sending from the device to the host. The second packet contains a DATA1 PID followed by a block of bytes labeled "Payload Data". The device indicates successful receipt of the data by sending back the ACK PID 450 in the third handshake packet 432. The host computer then sends out another OUT token, this time using the DATA0 PID, followed by more payload data 428. Finally, the device sends back another ACK to conclude the transfer.

The two data PIDS, DATA0 and DATA1, provide added data security beyond CRC checking to guard against corrupted handshake packets, and to maintain synchronism throughout long-bulk transfers. Bulk data is transferred using alternating DATA PIDS. The host computer and peripheral device maintain "data toggle" bits that are complemented when data is successfully sent and acknowledged. If either side fails to read a correct handshake, it does not flip its data toggle, causing a mismatch with the next data PID. This initiates a retry. All of this is handled automatically by SIE 128.

Figure 5:
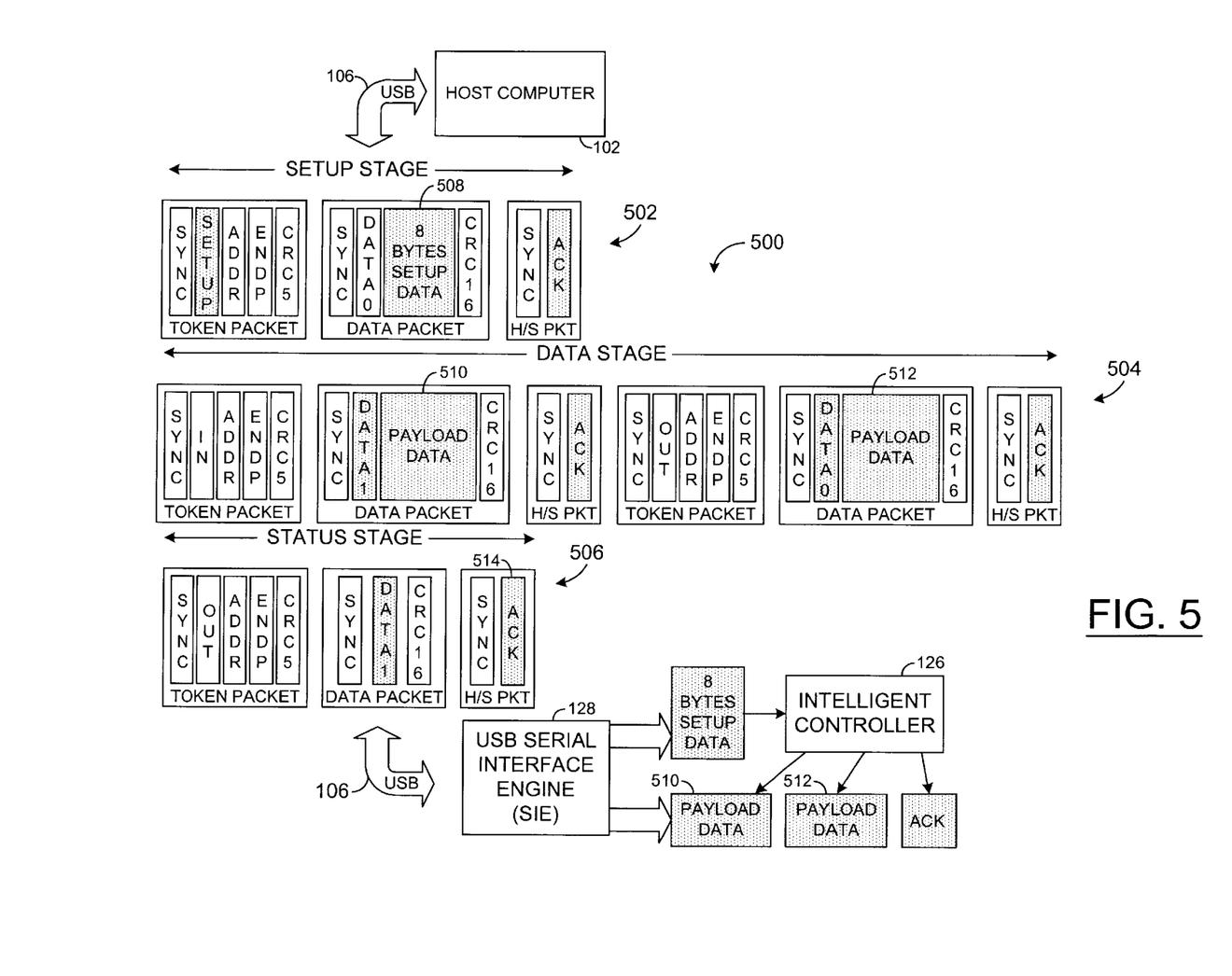
FIG. 5. is a diagrammatic view illustrating a USB control transfer to send data from a device to a host computer.

The transaction illustrated in FIG. 5 shows a data transfer by way of a control transfer from the host computer 102 to device 101 (not shown). In operation, the device receives the control transfer 500 that includes SETUP Stage 502, Data Stage 504, and STATUS Stage 506, via the USB. The device control that includes a USB SIE 128 receives the control transfer 500 and decodes the data packets. The 8 set-up bytes 508 included in the SETUP Stage 502 are transferred to the intelligent controller 126 contained in the USB dedicated circuit 124 (see FIG. 1) for decoding. As discussed above, the intelligent controller can be a hard-wired circuit, a programmable state machine or some other type of circuit for interpreting the set-up data and performing other USB related functions. In response, the intelligent controller 126 sends the payload data 510, 512 to the SIE 128, which then sends the data packets to host computer 102 for processing followed by an acknowledgment signal ACK 514 to conclude the transaction. This is consistent with the directional fields found in the data stage 504 and the status stage 506 as shown in FIG. 5, where the IN field indicates a transfer from the device to the host computer and where the OUT field indicates a transfer from the host computer 102 to the device.

Figure 6A:
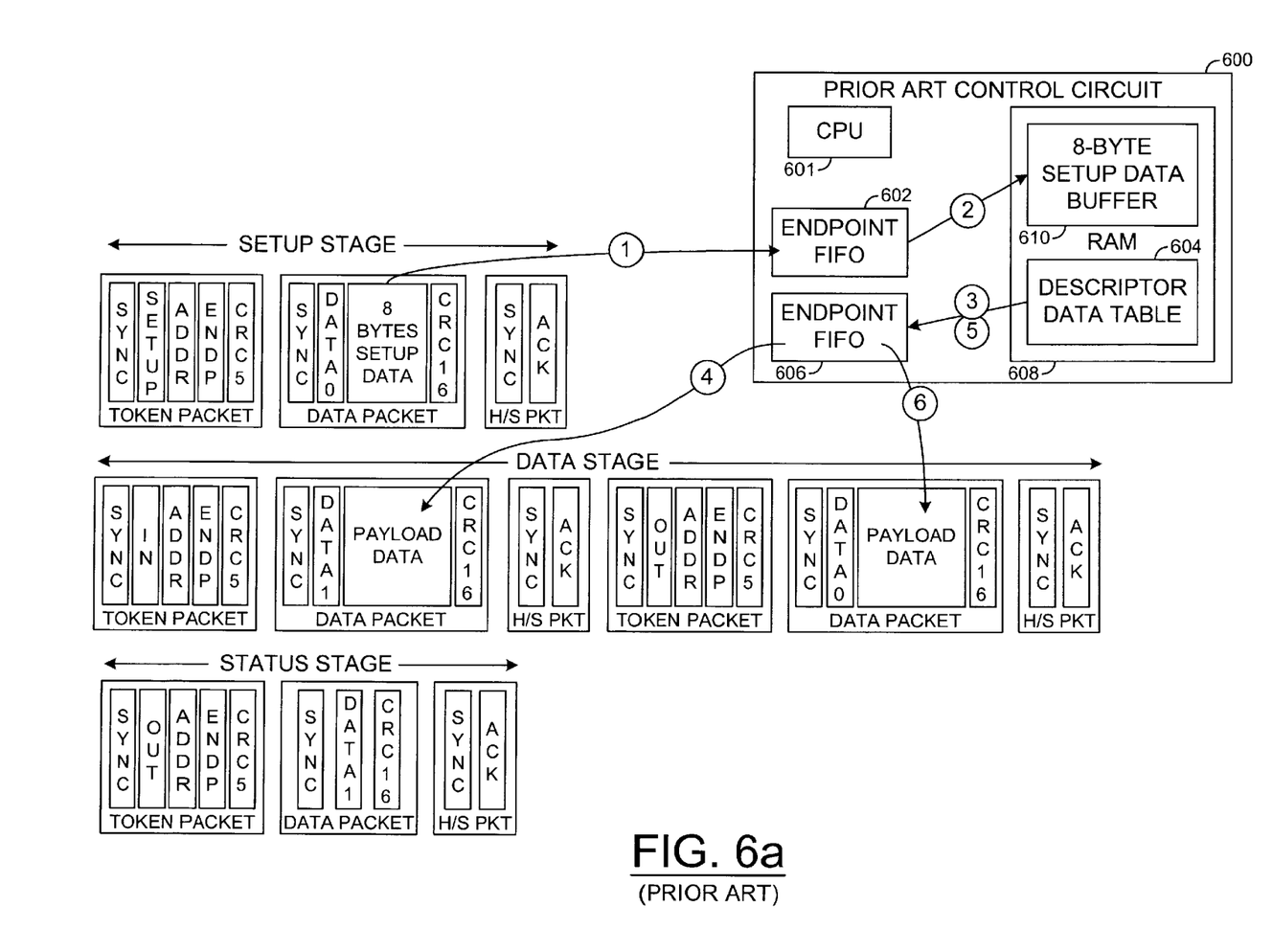
FIGS. 6a and 6b illustrate a USB transaction by a peripheral device without a USB dedicated circuit.
Figure 6B:
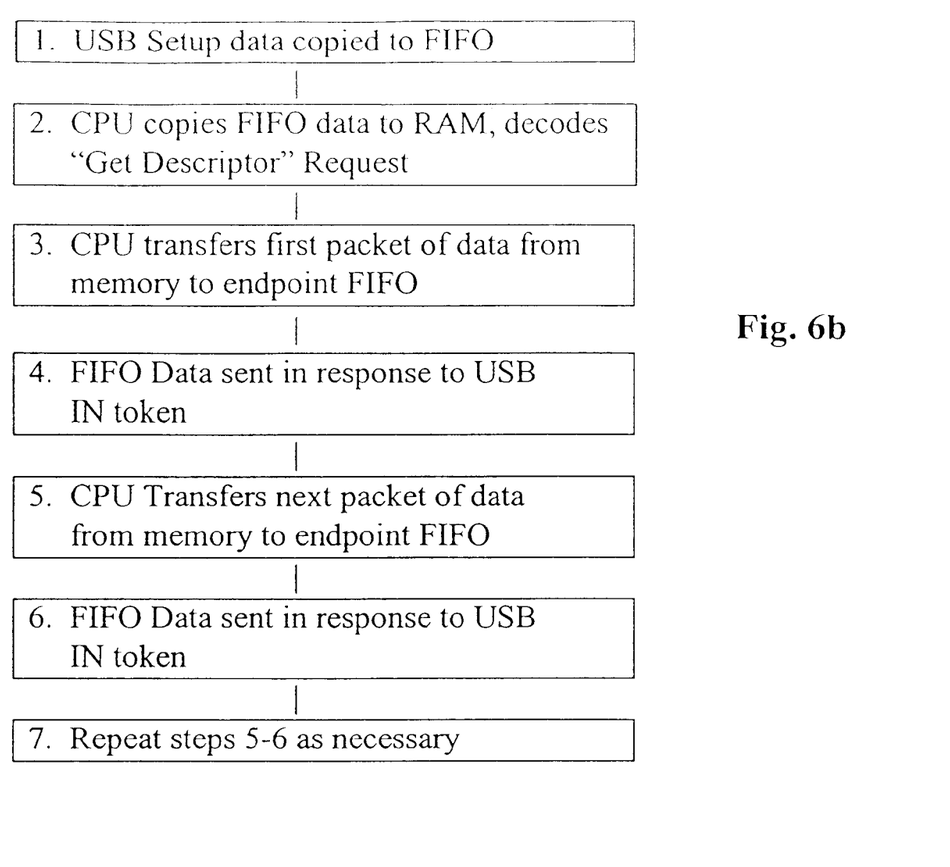
Figure 7A:
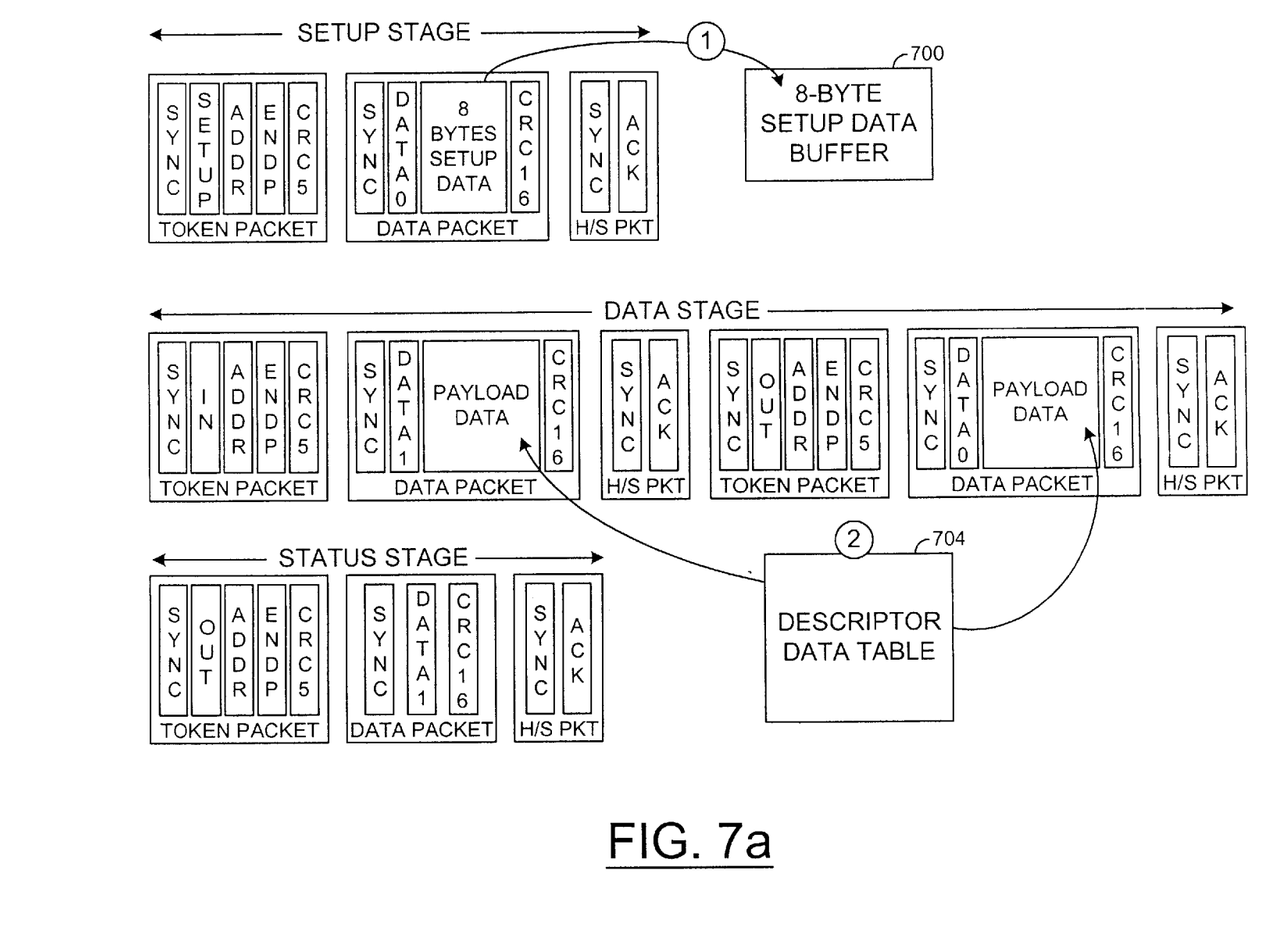
FIGS. 7a and 7b illustrate a USB transaction by a peripheral device having a USB dedicated circuit in accordance with the present invention.
Figure 7B:
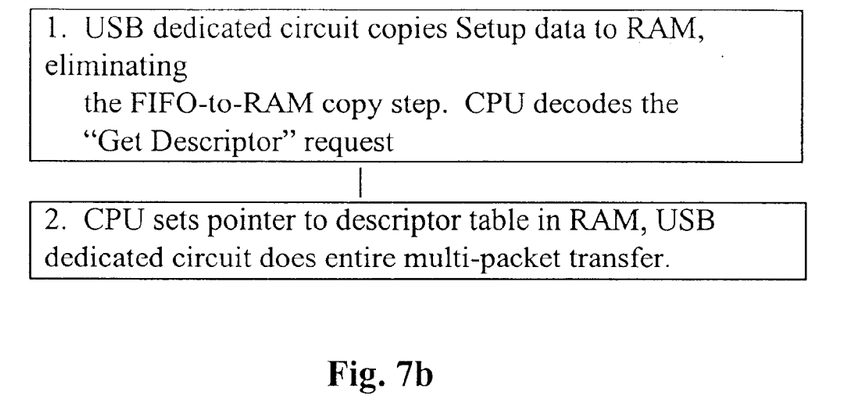

FIGS. 6*a* and 6*b* illustrate the data control configuration in the prior art and are useful for showing disadvantages of the prior art as compared to the data control protocol of the invention as illustrated in FIGS. 7*a* and 7*b*. Referring to FIGS. 6*a* and 6*b*, data control is illustrated in the context of a control transfer while a device (not shown) having a control circuit 600 is being enumerated in the absence of a USB dedicated circuit. In contrast, FIGS. 7*a* and 7*b* illustrate a control transfer utilizing a USB dedicated circuit in accordance with the invention. First referring to FIG. 6*a*, in Step 1, USB SETUP data is received from the host computer via the USB (both not shown) and received in a first-in/first-out circuit (FIFO) 602 (see Step 1 of FIG. 6*b*). Next, in Step 2, the device CPU 601 copies the data from the FIFO 602 to the device RAM 608 that includes an 8-byte SETUP data buffer 610 for holding the data. In a data transfer, the FIFO data includes a "get descriptor" request from the host computer when requesting data from the peripheral device. Descriptors are data fields in RAM 608 that instruct the operating system about the operation the operation of the device. In Step 3, the device CPU transfers a first packet of data from the descriptor data table 604 contained in the device RAM 608 to a second endpoint FIFO 606. In the next step, Step 4, FIFO data is sent to the host in response to a USB IN token sent by the host computer. In Step 5, the device CPU 601 transfers the next packet of data from the RAM 608 to endpoint FIFO 606. In Step 6, the FIFO data is sent in response to a second USB IN token sent by the host computer. Steps 5 and 6 would need to be repeated in this prior art process when transferring data between the host computer and the peripheral device.

Referring now to FIGS. 7*a* and 7*b*, a data transfer is illustrated for a peripheral device having a USB dedicated circuit in accordance with the present invention. The process is reduced from the seven steps discussed in connection with FIGS. 6*a* and 6*b* to a simple two-step process. In Step 1, the USB dedicated circuit (see FIG. 1) copies the SETUP data directly to the device RAM buffer 700 in the peripheral device, eliminating the FIFO-to-RAM copy Step 2 of the prior art. The device CPU, in the same step, decodes the "get descriptor" request. In Step 2, the device CPU sets its memory pointer to the descriptor table 702 in RAM, such as that of Table 1 above, followed by the USB dedicated circuit completing an entire multi-packet transfer. Hence, utilization of the USB dedicated circuit by the device CPU can reduce a simple data transfer from six or more steps to merely two steps. This is because the device having a USB dedicated circuit performing USB specific functions can operate in parallel with the device CPU performing other functions.

Thus, in accordance with the invention, a USB dedicated circuit can allow a host computer to enumerate a device by communicating solely with a USB dedicated circuit. Furthermore, the USB dedicated circuit can utilize intelligent controller to load program code into the device RAM to configure the control circuit. The resulting circuit can also provide a device CPU integrated with USB dedicated circuit 400 to utilize the intelligent controller to perform short cut routines such is that described in connection with FIGS. 7*a*, 7*b*. The resulting configured controlled circuit, in accordance with the invention, provides in an efficient control circuit that includes a device CPU to control the data transfers to and from the peripheral device, having access to the intelligent controller to utilize common functions between the peripheral device and the USB.

While the foregoing description has been with reference to particular embodiments of the invention, it will be appreciated that these are only illustrative of the invention and that changes may be made to those embodiments without departing from the principles of the invention, the scope of which is defined by the appended claims.

What is claimed is:

1. A device controller for a peripheral device communicating with a host computer via a Universal Serial Bus (USB), the peripheral device having a central processing unit (CPU) for managing communications between peripheral device and the host computer and a device memory for storing data, the device controller comprising:

an interface connecting the device controller with the USB; and a second controller responsive to the host computer sending a set-up signal for controlling enumeration of the peripheral device by communicating with the interface to exchange data with the host computer, the second controller further being responsive to a control signal from the CPU controlling the device memory to store data received by the host computer and for retrieving data to be sent to the host, and the second controller further being responsive to the CPU for relinquishing control of the peripheral device to the CPU.

2. A device controller according to claim 1, wherein the second controller comprises a state machine that is configured to routinely respond to predetermined commands.

3. A device controller according to claim 2, wherein the state machine is configured to control enumeration of the peripheral device in response to the host computer sending a set-up signal.

4. A device controller according to claim 1, wherein the interface is a USB interface configured to communicate with the second controller and the USB to exchange data between the second controller and the host computer.

5. A device controller according to claim 4, wherein the USB interface is dedicated to control USB function related data traffic between the USB and the second controller such that the USB interface working in conjunction with the second controller can control data transfers relating to USB related functions including enumeration, receiving configuration code from the host computer and storing the code in said device memory for use by said CPU to control said peripheral device.

6. A device controller according to claim 1, wherein the CPU is configured to communicate with said host computer via the USB and to perform interchangeable and joint operations with the second controller including enabling the host computer to recognize and enumerate the peripheral device as a USB compliant device.

7. A device controller according to claim 1, wherein the device memory is configured to store software code used by the CPU to control the functions of the peripheral device and wherein the second controller is configured to load software code received via the USB onto the device memory.

8. A device controller according to claim 1, wherein the second controller is a coded state machine configured to communicate with the host computer to enable the host computer to enumerate the peripheral device, load software code onto the device memory and operate in conjunction with the CPU after start-up of the peripheral device.

9. A device controller for use in a peripheral electronic device and configured to communicate with a host computer comprising:
  a central processing unit (CPU) configured to communicate with a host computer via a Universal Serial Bus (USB);
  a device memory for storing data;
  an interface that enables communication between the device controller and the USB; and
  a second controller responsive to the host computer sending a set-up signal for controlling enumeration of the peripheral device by communicating with the interface to exchange data with the host computer, the second controller further being responsive to a control signal from the CPU controlling the device memory to store data received by the host computer and for retrieving data to be sent to the host, and the second controller further being responsive to the CPU for relinquishing control of the peripheral device to the CPU.

10. A device controller according to claim 9, wherein the second controller comprises a state machine that is configured to routinely respond to predetermined commands.

11. A device controller according to claim 10, wherein the state machine is configured to control enumeration of the peripheral device in response to the host computer sending a set-up signal.

12. A device controller according to claim 9, wherein the interface is a USB interface configured to communicate with the second controller and the USB to exchange data between the second controller and the host computer.

13. A device controller according to claim 12, wherein the USB interface is dedicated to control USB function related data traffic between the USB and the second controller such that the USB interface working in conjunction with the second controller can control data transfers relating to USB related functions including enumeration, receiving configuration code from the host computer and storing the code in said device memory for use by said CPU to control said peripheral device.

14. A device controller according to claim 9, wherein the CPU is configured to communicate with said host computer via the USB and to perform interchangeable and joint operations with the second controller including enabling the host computer to recognize and enumerate the peripheral device as a USB compliant device.

15. A device controller according to claim 9, wherein the device memory is configured to store software code used by the CPU to control the functions of the peripheral device and wherein the second controller is configured to load software code received via the USB onto the device memory.

16. A device controller according to claim 9, wherein the second controller is a coded state machine configured to communicate with the host computer to enable the host computer to enumerate the peripheral device, load software code onto the device memory and operate in conjunction with the CPU after start-up of the peripheral device.

17. A computer system comprising:
  a host computer configured to process data;
  a Universal Serial Bus (USB) communicating with the host computer; and
  a peripheral device communicating with the host computer via the USB for exchanging data with the host computer, the peripheral device including:
    a central processing unit (CPU) for managing communications between the peripheral device and the host computer;
    an interface for communication between the peripheral device and the USB;
    a device memory for storing data; and
    a second controller responsive to the host computer sending a set-up signal for controlling enumeration of the peripheral device by communicating with the interface to exchange data with the host computer, the second controller further being responsive to a control signal from the CPU controlling the device memory to store data received by the host computer and for retrieving data to be sent to the host computer, and the second controller further being responsive to the CPU for relinquishing control of the peripheral device to the CPU.

18. A device controller according to claim 17, wherein the second controller comprises a state machine that is configured to routinely respond to predetermined commands.

19. A device controller according to claim 18, wherein the state machine is configured to control enumeration of the peripheral device in response to the host computer sending a set-up signal.

20. A device controller according to claim 17, wherein the interface is a USB interface configured to communicate with the second controller and the USB to exchange data between the second controller and the host computer.

21. A device controller according to claim 20, wherein the USB interface is dedicated to control USB function related data traffic between the USB and the second controller such that the USB interface working in conjunction with the second controller can control data transfers relating to USB related functions including enumeration, receiving configuration code from the host computer and storing the code in said device memory for use by said CPU to control said peripheral device.

22. A device controller according to claim 17, wherein the CPU is configured to communicate with said host computer via the USB and to perform interchangeable and joint operations with the second controller including enabling the host computer to recognize and enumerate the peripheral device as a USB compliant device.

23. A device controller according to claim 17, wherein the device memory is configured to store software code used by the CPU to control the functions of the peripheral device and wherein the second controller is configured to load software code received via the USB onto the device memory.

24. A device controller according to claim 17, wherein the second controller is a coded state machine configured to communicate with the host computer to enable the host computer to enumerate the peripheral device, load software code onto the device memory and operate in conjunction with the CPU after start-up of the peripheral device.

25. A method of controlling data transfers between a peripheral device and a host computer via a Universal Serial Bus (USB), the peripheral device having a central processing unit (CPU) for managing communications between the peripheral device and the host computer, a USB interface interfacing the CPU and a controller with the USB, and a device memory connected to the CPU and to the controller for storing data, the method comprising:

receiving a set-up signal from the host computer at the controller;

sending an acknowledgment signal from the controller to the host computer to acknowledge receipt of the set-up signal;

sending peripheral device configuration data from the host computer to the controller in response to the acknowledgment signal, the configuration data defining parameters for communicating with the peripheral device;

storing the configuration data in the device memory using the controller; and sending a signal from the controller to the CPU to cause the CPU to assume control of the peripheral device from the controller.

26. A method according to claim 25 further comprising:

transmitting a signal from the host computer to the CPU indicating that data is to be transferred to the peripheral device;

sending a control signal from the CPU to the controller to cause the controller to assume control of the device memory; and transferring data from the device memory to a host computer memory under control of the controller via the USB interface and the USB.

27. A method according to claim 25 further comprising:

transmitting a signal from the CPU to the controller to relinquish control of the device memory to the controller to store data received from the host computer;

transferring data from the host computer to the peripheral device; and storing the data in the device memory under the control of the controller.

* * * * *